United States Patent
Johansson et al.

(10) Patent No.: US 9,456,457 B2
(45) Date of Patent: Sep. 27, 2016

(54) METHOD AND ARRANGEMENT IN A COMMUNICATIONS NETWORK

(71) Applicant: Telefonaktiebolaget L M Ericsson (publ), Stockholm (SE)

(72) Inventors: Niklas A. Johansson, Uppsala (SE); Johan Mikael Bergman, Stochholm (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 476 days.

(21) Appl. No.: 13/942,016

(22) Filed: Jul. 15, 2013

(65) Prior Publication Data

US 2013/0301581 A1    Nov. 14, 2013

Related U.S. Application Data

(63) Continuation of application No. 13/262,579, filed as application No. PCT/SE2011/051119 on Sep. 19, 2011, now Pat. No. 8,515,442.

(60) Provisional application No. 61/407,942, filed on Oct. 29, 2010.

(51) Int. Cl.
   *H04W 74/08* (2009.01)
   *H04W 74/00* (2009.01)

(52) U.S. Cl.
   CPC ....... *H04W 74/0833* (2013.01); *H04W 74/006* (2013.01)

(58) Field of Classification Search
   None
   See application file for complete search history.

(56) References Cited

U.S. PATENT DOCUMENTS

| | | | |
|---|---|---|---|
| 8,036,154 B2 | 10/2011 | Jung | |
| 8,149,773 B2 | 4/2012 | Sambhwani et al. | |
| 8,238,837 B2 | 8/2012 | Womack et al. | |
| 8,270,990 B2 | 9/2012 | Zhao | |
| 8,416,724 B2 | 4/2013 | Koskan | |
| 2009/0196242 A1* | 8/2009 | Sambhwani | H04W 74/0866 370/329 |
| 2009/0232036 A1 | 9/2009 | Marx | |
| 2010/0159970 A1* | 6/2010 | Hagerman | H04W 74/0866 455/500 |

OTHER PUBLICATIONS

3GPP, "Technical Specification Group Radio Access Network; Physical channels and mapping of transport channels onto physical channels (FDD) (Release 9)", 3GPP TS 25.211 V9.2.0 (Sep. 16, 2010), pp. 1-58.

Panasonic et al., "Timing of aich transmission/reception", TSG-RAN Working Group 1 meeting #4, Shin-Yokohama, Japan (Apr. 15, 1999), TSGR1#4(99)374.

(Continued)

*Primary Examiner* — Huy D Vu
*Assistant Examiner* — Hong Shao
(74) *Attorney, Agent, or Firm* — Patents on Demand P.A.; Brian K. Buchheit; Scott M. Garrett

(57) ABSTRACT

A method for enhancing Random Access Channel (RACH) performance is provided. First timing settings to be used by a first set of user equipments for a first Acquisition Indicator Channel (AICH) response timing are explicitly or implicitly signaled from a NodeB or from a Radio Network Controller (RNC) to a user equipment. Further, second timing settings to be used by a second set of user equipments for a second AICH response timing are explicitly or implicitly signaled from the NodeB or from the RNC to the user equipment.

16 Claims, 5 Drawing Sheets

(56) References Cited

OTHER PUBLICATIONS

Ericsson, "Some minor modifications to the UTRA/FDD RACH scheme", TSG-RAN Working Group 1 meeting #3, Nynäshamn, Sweden, (Mar. 19, 1999), TSGR1 #3(99)207.

Ericsson et al., "Further Uplink Enhancements to CELL_FACH", 3GPP TSG RAN WG1 Meeting #66, Athens, Greece (Aug. 16, 2011), R1-112617.

Ericsson et al., "On Further Enhancements to CELL-FACH", 3GPP TSG RAN WG1 Meeting #65, Barcelona, Spain (May 3, 2011), R1-111764.

* cited by examiner

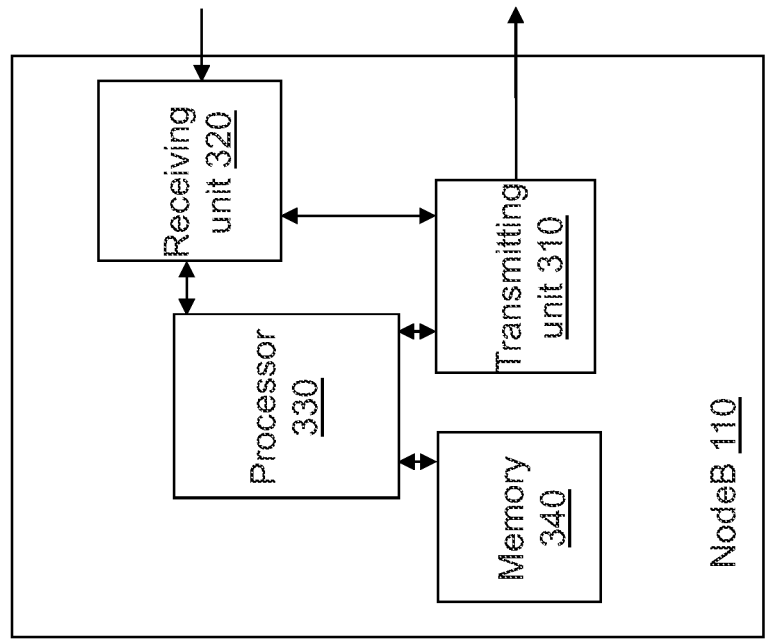
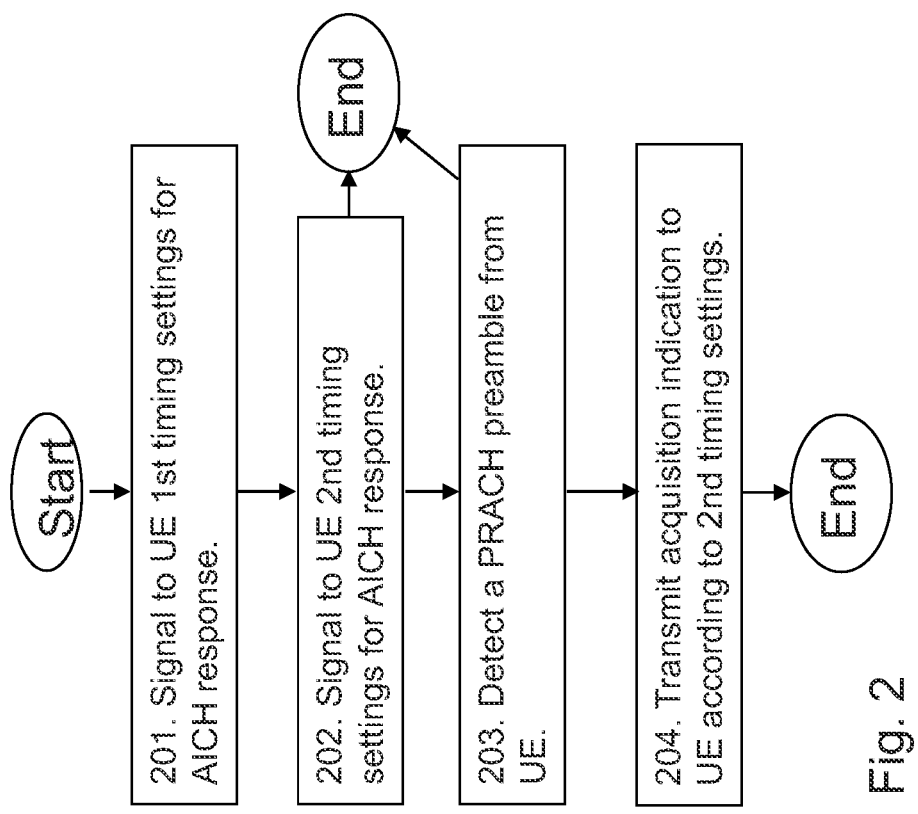
Fig. 3
Fig. 2

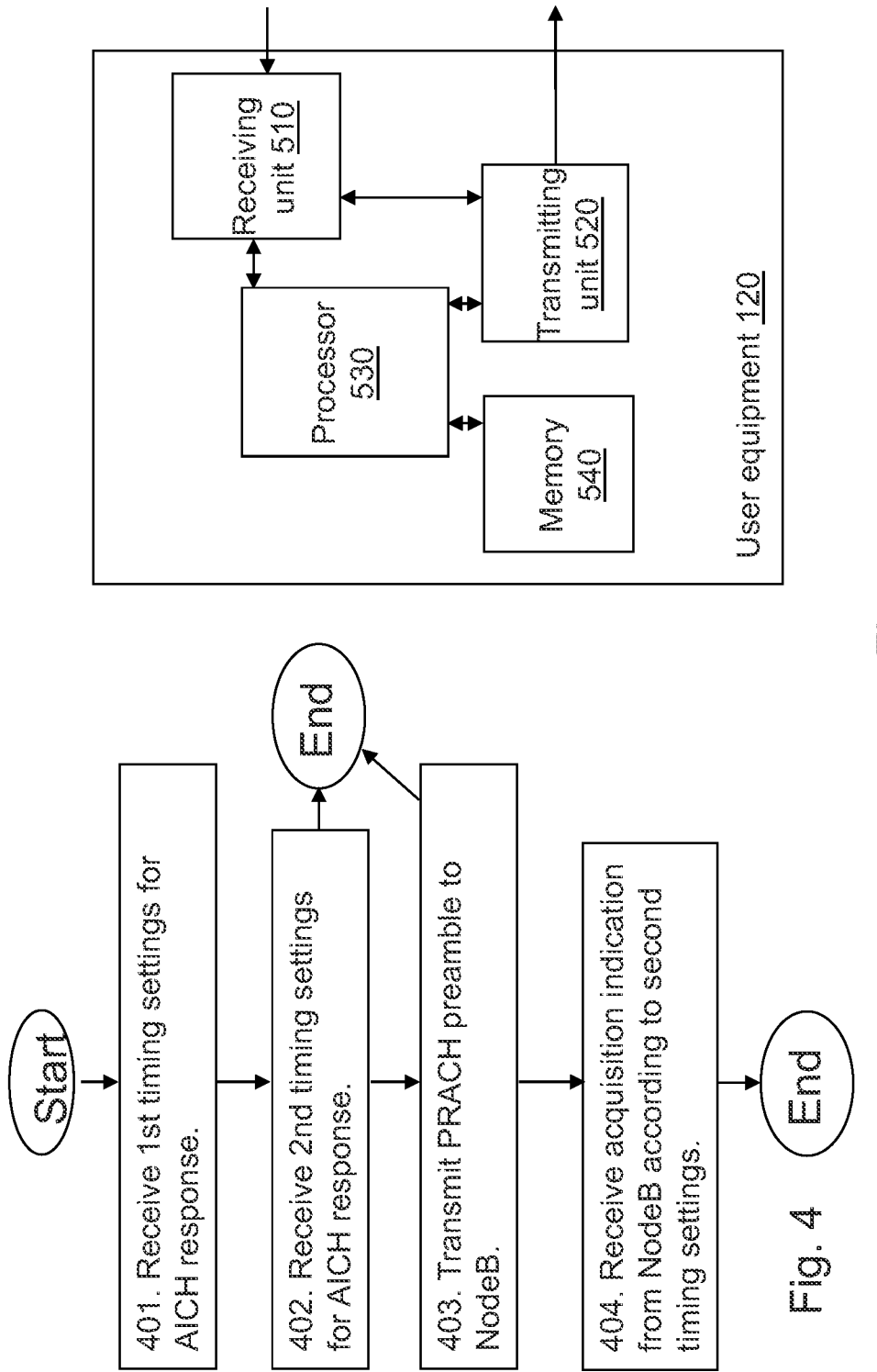

METHOD AND ARRANGEMENT IN A COMMUNICATIONS NETWORK

RELATED APPLICATIONS

This application is a continuation of prior U.S. application Ser. No. 13/262,579, filed Sep. 30, 2011, which was the National Stage of International Application No. PCT/SE2011/051119, filed Sep. 19, 2011, which claims the benefit of U.S. Provisional Application No. 61/407,942 filed Oct. 29, 2010, the disclosures of each of which are incorporated herein by reference in their entirety.

TECHNICAL FIELD

Embodiments herein relate to a user equipment, a method therein, a NodeB, and a method in a network. In particular, it relates to enhancing Random Access Channel (RACH) performance.

BACKGROUND

Communication devices such as User Equipments (UE) are also known as e.g., mobile terminals, wireless terminals and/or mobile stations. User equipments are enabled to communicate wirelessly in a cellular communications network or wireless communication system, sometimes also referred to as a cellular radio system or cellular networks. The communication may be performed e.g., between two user equipments, between a user equipment and a regular telephone and/or between a user equipment and a server via a Radio Access Network (RAN) and possibly one or more core networks, comprised within the cellular communications network.

User equipments may further be referred to as mobile telephones, cellular telephones, or laptops with wireless capability, just to mention some further examples. The user equipments in the present context may be, for example, portable, pocket-storable, hand-held, computer-comprised, or vehicle-mounted mobile devices, enabled to communicate voice and/or data, via the RAN, with another entity, such as another user equipment or a server.

The cellular communications network covers a geographical area which is divided into cell areas, wherein each cell area being served by a base station, e.g., a Radio Base Station (RBS), which sometimes may be referred to as e.g., "eNB", "NodeB", "NodeB", "B node", or BTS (Base Transceiver Station), depending on the technology and terminology used. The base stations may be of different classes such as e.g., macro NodeB, home NodeB or pico base station, based on transmission power and thereby also cell size. A cell is the geographical area where radio coverage is provided by the base station at a base station site. One base station, situated on the base station site, may serve one or several cells. Further, each base station may support one or several communication technologies. The base stations communicate over the air interface operating on radio frequencies with the user equipments within range of the base stations.

In some RANs, several base stations may be connected, e.g., by landlines or microwave, to a radio network controller, e.g., a Radio Network Controller (RNC) in Universal Mobile Telecommunications System (UMTS), and/or to each other. The radio network controller, also sometimes termed a Base Station Controller (BSC) e.g., in GSM, may supervise and coordinate various activities of the plural base stations connected thereto. GSM is an abbreviation for Global System for Mobile Communications (originally: Groupe Spécial Mobile).

In 3rd Generation Partnership Project (3GPP) Long Term Evolution (LTE), base stations, which may be referred to as eNodeBs or even eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies.

According to 3GPP/GERAN, a user equipment has a multi-slot class, which determines the maximum transfer rate in the uplink and downlink direction. GERAN is an abbreviation for GSM EDGE Radio Access Network. EDGE is further an abbreviation for Enhanced Data rates for GSM Evolution.

In the context of this disclosure, the expression Downlink (DL) is used for the transmission path from the base station to the mobile station. The expression Uplink (UL) is used for the transmission path in the opposite direction i.e., from the mobile station to the base station.

RACH is a common uplink transport channel used by a user equipment to access a network in case the user equipment does not have a dedicated uplink. The RACH channel may be used for transmitting data in Cell_FACH state. The RACH channel is often carrying signaling e.g., buffer-status measurements, cell update messages, etc., that will trigger a state change from Cell_FACH state to Cell_DCH state, where a dedicated uplink channel is available.

The CELL_DCH state is e.g., characterized by:

A dedicated physical channel is allocated to the user equipment in uplink and downlink.

The user equipment is known on cell level according to its current active set.

Downlink and uplink dedicated transport channels, downlink shared transport channels, and a combination of these transport channels can be used by the user equipment.

The CELL_FACH state is e.g., characterized by:

No dedicated physical channel is allocated to the user equipment.

The user equipment monitors the downlink for transmissions.

The user equipment is assigned a default common or shared transport channel in the uplink, Random Access Channel (RACH) or Common Enhanced Dedicated channel (E-DCH), that it may use anytime according to the access procedure for that transport channel.

The position of the user equipment is known by UTRAN on cell level according to the cell where the user equipment last made a cell update.

The RACH procedure comprises a power-ramping phase on the Physical Random Access Channel (PRACH), where the desire is to find the correct power level to be used by the user equipment for uplink transmission. Once a user equipment is detected on PRACH, the NodeB responds with an acquisition indication on the Acquisition Indication Channel (AICH), which acknowledges the correct power level on PRACH. The user equipment then continues by transmitting in-band RACH payload carried on PRACH.

In WCDMA the random access channel is divided in time into 750 access slots per second, and there are up to 16 different preambles that can be used per scrambling code. When making a random access attempt the user equipment chooses from a subset of the access slots and selects randomly one preamble out of a subset of the up to 16 possible preambles. After the preamble has been transmitted the user equipment waits for a response on the acquisition indicator channel (AICH). The timing of this response is determined by the parameter $\tau_{p-a}$.

If no acknowledgement is received the random access attempt continues and a new preamble, randomly chosen from the available ones, is transmitted with higher power. This procedure is repeated until a response in the form of an acknowledgement or a non-acknowledgement is received, too many unsuccessful preamble transmissions have been made or the maximum allowed transmit power has been used by the user equipment for a number of transmissions. If the user equipment is not acknowledged during its random access attempt it will start another random access attempt at a later time.

The stepwise preamble power increase is called power ramping. The idea is that random access user equipments should start their transmissions with low power to minimize the interference they generate, and with each new preamble that is transmitted increase the transmission power until it is high enough for successful reception by the NodeB. When the user equipment receives an acknowledgement it stops the power ramping and transmits the random access message with a power related to the one used for the last preamble.

An enhanced random access method known as "Enhanced Uplink in CELL_FACH state" was introduced in Release 8. The releases mentioned in this document relates to releases of HSPA 3GPP specifications. A portion of the preamble signatures may be set aside for Release 99 method and another portion for the Release 8 method. The preamble ramping procedure is essentially the same for both methods, except that an optional extended acquisition indication called Extended Acquisition Indication (EAI) has been introduced beside the ordinary AI. The message parts are more different for the two methods, showing similar differences as Release 99 Dedicated Channel (DCH) and Release 6 Enhanced Dedicated Channel (E-DCH) in the CELL_DCH state.

The problem with the existing solution is that different random access attempts might require different levels of receiver processing to be detected. Some preambles may be quickly detected and should then also be acknowledged quickly to keep latency down, while other preambles might require more advanced processing that requires longer processing time to enable successful detection.

SUMMARY

One or more embodiments of the present disclosure provide a way of enhancing RACH performance.

According to one or more embodiments, in a method for enhancing Random Access Channel (RACH) performance, first timing settings to be used by a first set of user equipments for a first Acquisition Indicator Channel (AICH) response timing are explicitly or implicitly signaled from a NodeB or from a Radio Network Controller (RNC) to a user equipment. Further, second timing settings to be used by a second set of user equipments for a second AICH response timing are explicitly or implicitly signaled from the NodeB or from the RNC to the user equipment.

According to one or more embodiments, in a method in a user equipment for enhancing Random Access Channel (RACH) performance, the user equipment receives first timing settings explicitly or implicitly signaled from a NodeB or from a Radio Network Controller (RNC). The first timing settings are to be used by a first set of user equipments for a first Acquisition Indication Channel (AICH) response timing. The user equipment further receives second timing settings explicitly or implicitly signaled from the NodeB or from the RNC. The second timing settings are to be used by a second set of user equipments for AICH response timing. The user equipment is comprised in the second set of user equipments.

According to one or more embodiments, a NodeB for enhancing Random Access Channel (RACH) performance comprises a transmitting unit configured to explicitly or implicitly signal to a user equipment, first timing settings. The first timing settings are to be used by a first set of user equipments for a first Acquisition Indicator Channel (AICH) response timing. The transmitting unit further is configured to explicitly or implicitly signal to the user equipment, second timing settings to be used by a second set of user equipments for a second AICH response timing.

According to one or more embodiments, a user equipment for enhancing Random Access Channel (RACH) performance comprises a receiving unit configured to receive first timing settings explicitly or implicitly signaled from a NodeB or from a Radio Network Controller (RNC). The first timing settings are to be used by a first set of user equipments for a first Acquisition Indication Channel (AICH) response timing. The receiving unit is further configured to receive second timing settings explicitly or implicitly signaled from the NodeB or from the RNC. The second timing settings are to be used by a second set of user equipments for AICH response timing. The user equipment is comprised in the second set of user equipments.

Since embodiments herein enable different processing time and consequently different detection response times for different user equipments and/or random access attempts, user equipments with good RACH coverage benefits from shorter acknowledgement timing which reduces delay and latency, while at the same time user equipments with worse coverage can benefit from more advanced RACH receivers that require more processing time. This in turn results in that the RACH performance is enhanced.

An advantage of embodiments herein is that a new AICH response timing may be used for new user equipments simultaneously with the currently specified timing for legacy user equipments.

Of course, the present disclosure is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 2 is a flowchart depicting embodiments of a method.

FIG. 3 is a schematic block diagram illustrating embodiments of a NodeB.

FIG. 4 is a flowchart depicting embodiments of a method in a user equipment.

FIG. 5 is a schematic block diagram illustrating embodiments of a user equipment.

DETAILED DESCRIPTION

Embodiments will be exemplified in the following non-limiting description.

Embodiments herein relate to the Random Access Procedure in UTRAN and relates to higher layer signaling facilitating reduction of interference during a preamble ramping procedure, i.e., preamble power ramping. Embodiments herein enable different processing time and consequently different detection response times for different user equipments and/or random access attempts. This results in that user equipments with good RACH coverage may benefit from shorter acknowledgement timing which reduces delay and latency, while at the same time user equipments with worse coverage may benefit from more advanced RACH receivers that require more processing time.

Figure 1:
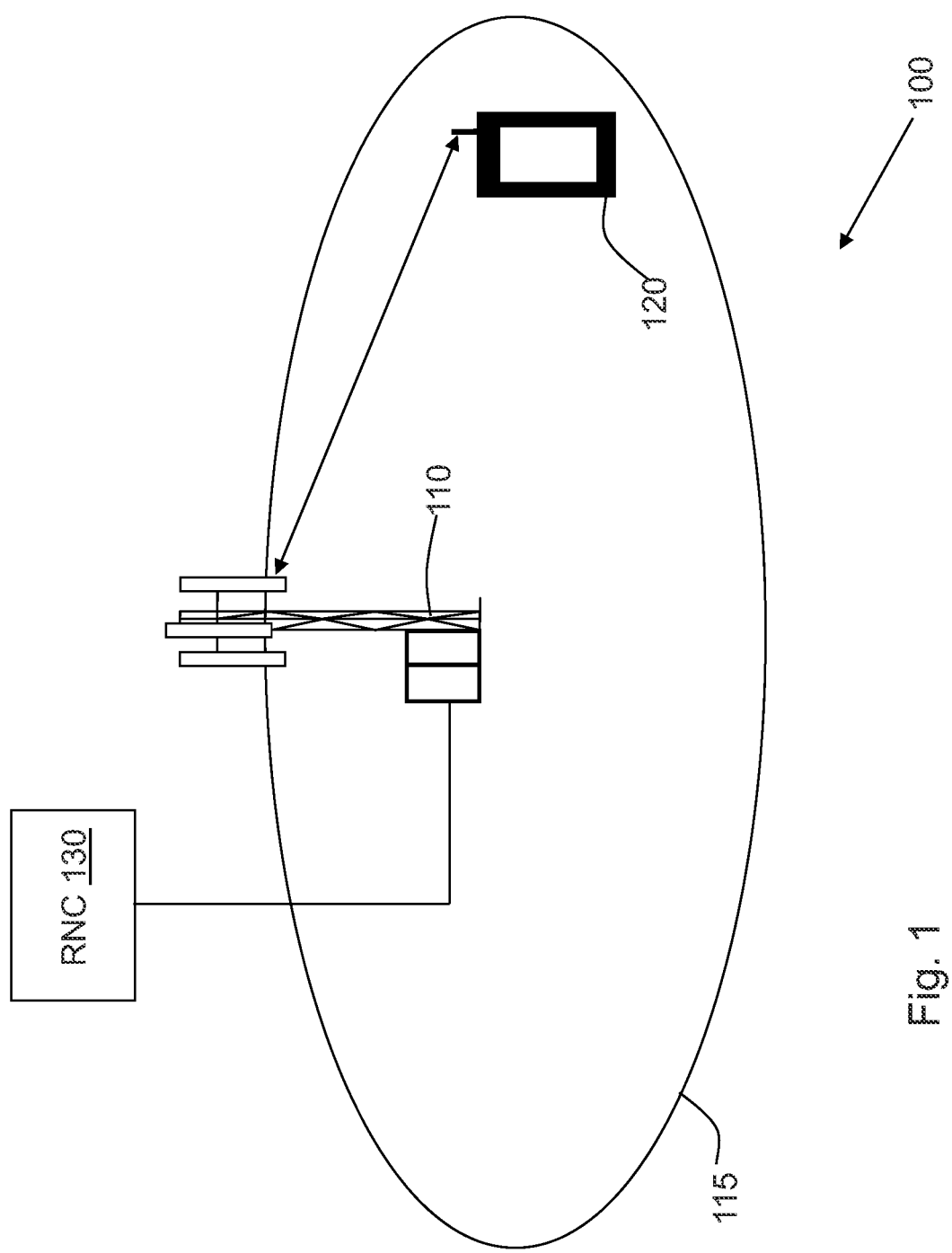
FIG. 1 is a schematic block diagram illustrating embodiments of a network.

FIG. 1 depicts a network 100, such as a wireless communications network in which embodiments herein may be implemented. The network 100 is a cellular communication network such as UTRAN comprising UMTS Terrestrial Radio Access (UTRA) and/or UMTS and/or WCDMA networks.

The network 100 comprises a NodeB. The NodeB is a radio base station serving a cell. The NodeB is capable to serve user equipments in the cell. The user equipments may also be referred to as users. For convenience user equipments are often divided into two sets in the description below. However, user equipments may also be divided into three or more sets and the same methods may be used also in these cases. The user equipments may e.g., be divided into different sets of user equipments with different acknowledgement timing constraints. In one embodiment this division is based on a user equipment category or a user equipment capability.

A user equipment is located within the cell. The user equipment is in some figures is referred to as user equipment, and is configured to communicate within the network via the NodeB over a radio link when the user equipment is present in the cell served by the NodeB.

The user equipment may e.g., be a mobile terminal or a wireless terminal, a mobile phone, a computer such as e.g., a laptop, a Personal Digital Assistant (PDA) or a tablet computer, sometimes referred to as a surf plate, with wireless capability, or any other radio network unit capable to communicate over a radio link in a cellular communications system.

The network 100 further comprises a Radio Network Controller (RNC) 130, which RNC 130 among other things has the role of configuring the cell(s) of the NodeB with cell information such as the "AICH transmission timing", or "AICH response timing" using the terminology in this document, and to receive uplink data transmissions from the user equipment, via NodeB, and transmit downlink data transmissions to the user equipment, via NodeB. The RNC 130 uses the Radio Resource Control (RRC) protocol to configure the user equipment and the Node B Application Part (NBAP) and/or Radio Network Subsystem Application Part (RNSAP) protocols to configure the NodeB.

Embodiments will firstly be described in a perspective seen from the network, such as the NodeB and the RNC 130.

Embodiments of a method for enhancing RACH performance, will now be described with reference to the flowchart depicted in FIG. 2. User equipments within the network 100 are divided into one or more set of user equipments. In the embodiments in this example they are divided into two sets, a first set of user equipments and a second set of user equipments. The user equipments may be divided into the first set of user equipments and the second set of user equipments based on a user equipment category or a user equipment capability, such as e.g., if they support the extended timing or not, or if the user equipment is associated with a release of HSPA 3GPP specification that supports the extended timing or not.

User equipment categories may e.g., relate to maximum uplink or downlink data rates. The user equipment may signal its category and capabilities to the RNC 130.

For example, many features in release 99 of HSPA 3GPP specification are mandatory, meaning that any release 99 or later user equipment support them. However, most newer features in later releases of the standard are not mandatory but optional, and a user equipment's support of such an optional feature is referred to as a user equipment capability.

For example, a possible AICH Transmission Timing settings in of HSPA 3GPP specification, e.g., '0' and '1', are mandatory to support for all release 99 user equipments, and also for all newer user equipments. But if new settings are introduced in for example in release 11, e.g., '2' and '3' as a part of some new optional release 11 feature, then only a subset of the release 11 user equipments can be expected to implement this particular optional R11 feature. So a release 11 user equipment will only use new release 11 settings if the following conditions are met, otherwise it shall use the same settings as release 99 user equipments.

1) The user equipment has support for the optional feature.

2) The network supports the optional feature and is indicating, e.g., via a broadcasted signal from the NodeB in the cell, that the new timing setting should be used in the cell for user equipments that support it.

The method comprises the following actions, which actions may as well be carried out in another suitable order than described below.

Action 201

The user equipments within the network 100 are informed of which user equipments shall use which of the different processing times in action 201 and 202. Each group of user equipments is informed of what timing to use, they may however not aware what timing the other user equipments are supposed to use.

First timing settings to be used by the first set of user equipments for a first AICH response timing are explicitly or implicitly signaled from the NodeB or from the RNC to the user equipment. E.g., as per Release, each cell broadcasts via its serving NodeB the "AICH transmission timing" that it has been configured by the RNC to use. Release and later user equipments will all apply this AICH transmission timing, 0 or 1, when trying to access the cell.

In some embodiments the first AICH response timing is associated with a first level of receiver processing. E.g., in this example the first level is a level that relates to a less advanced receiver processing which is not so time consuming.

Action 202

Second timing settings to be used by the second set of user equipments for a second AICH response timing are explicitly or implicitly signaled from the NodeB or from the RNC 130, to the user equipment. The second AICH response timing may be associated with a second level of receiver processing. This action is performed in a similar way as the signaling of the first AICH response timing action 201. E.g., in this example the second level is a level that relates to an advanced receiver processing which is more time consuming than the first level. In these embodiments, the second set of user equipments may refer to newer user equipments of later releases compared to the first set of user equipments.

In some embodiments the first timing settings is used also by the second set of user equipments. The idea here is that a user equipment that belongs to the second set of user equipments, i.e., a newer user equipment will first try the first/older timing and if it doesn't receive an AICH response at this setting, it will wait a little longer and see if there is an AICH response at the second/newer timing.

The second AICH response timing may for example be extended compared to the first AICH response timing, or vice versa.

In this example the user equipment is comprised in the second set, but it may also be comprised in the first set.

Action 203

As mentioned above, the RACH procedure comprises a power-ramping phase on the PRACH, where the desire is to find the correct power level. Once a user equipment is detected on PRACH, the Node B responds with an acquisition indication on the AICH, which acknowledges the correct power level for the user equipment to use for uplink transmission on PRACH. The user equipment then continues by transmitting RACH payload carried on PRACH. This will be further described below with reference to FIGS. 6 and 7. The user equipment starts the RACH procedure by transmitting a PRACH preamble to the NodeB.

In this action, the NodeB detects the PRACH preamble associated with the user equipment, using the second level of receiver processing. In this example, the NodeB may use its more advanced RACH receiver that require more processing time, since the user equipment being comprised in the second set of user equipments is informed of the second AICH response timing to be used, which second AICH response timing in this example is extended, compared to the first AICH response timing. For example, when the more generous AICH response timing is used, the NodeB has sufficient time to cancel the interference from other user equipments such as in the form of E-DCH transmissions, before the NodeB has to try to detect the PRACH preamble and send the corresponding AICH response.

Action 204

When the PRACH preamble is detected, the NodeB transmits an acquisition indication to the user equipment. This is performed according to the second AICH response timing. The user equipment has been informed about the second AICH response timing and is therefore aware of when the acquisition indication may be expected.

To perform the method actions described above for enhancing RACH performance, the NodeB comprises the following arrangement depicted in FIG. 3. As mentioned above, user equipments within the network are divided into two or more set of user equipments. The embodiments in this example they are divided into two sets, a first set of user equipments and a second set of user equipments. The user equipments may be divided into the first set of user equipments and the second set of user equipments based on a user equipment category or a user equipment capability.

The NodeB comprises a transmitting unit configured to explicitly or implicitly signal to the user equipment, first timing settings to be used by a first set of user equipments for a first AICH response timing.

The transmitting unit is further configured to explicitly or implicitly signal to the user equipment, second timing settings to be used by a second set of user equipments for a second AICH response timing. The user equipment is comprised in the second set. In some embodiments the first AICH response timing is associated with a first level of receiver processing, and the second AICH response timing is associated with a second level of receiver processing. The second AICH response timing may for example be extended compared to the first AICH response timing.

The transmitting unit 310 may further be configured to transmit an acquisition indication to the user equipment according to the second AICH response timing and also according to the first AICH response timing.

In some embodiments, the first timing settings are used also by the second set of user equipments.

The NodeB further comprises a receiving unit configured to detect a Physical RACH preamble associated with the user equipment, using the second level of receiver processing.

The embodiments herein for enhancing RACH performance may be implemented through one or more processors, such as a processor in the NodeB depicted in FIG. 3, together with computer program code for performing the functions and actions of the embodiments herein. The program code mentioned above may also be provided as a computer program product, for instance in the form of a data carrier carrying computer program code for performing the embodiments herein when being loaded into the NodeB. One such carrier may be in the form of a CD ROM disc. It is however feasible with other data carriers such as a memory stick. The computer program code may furthermore be provided as program code on a server and downloaded to the NodeB.

The NodeB may further comprise a memory comprising one or more memory units. The memory 340 is arranged to be used to store data such as preambles, timing settings such as the first and second timing settings, schedulings, and applications to perform the methods herein when being executed in the NodeB.

Below, embodiments will be described in a perspective seen from the user equipment. Embodiments of a method in the user equipment for enhancing RACH performance will now be described with reference to the flowchart depicted in FIG. 4. User equipments within the network 100 are divided into two or more set of user equipments. In the embodiments in this example they are divided into two sets, a first set of user equipments and a second set of user equipments. In some embodiments, the user equipments are divided into the first set of user equipments and the second set of user equipments based on a user equipment category or a user equipment capability. The division into the first and second set of user equipment will be further described below.

The method comprises the following actions, which actions may as well be carried out in another suitable order than described below.

Action 401

The user equipment receives first timing settings explicitly or implicitly signaled from the NodeB or from the RNC 130. The first timing settings are to be used by the first set of user equipments for a first AICH, response timing.

In some embodiments, the first AICH response timing is associated with a first level of receiver processing.

Action 402

The user equipment further receives second timing settings explicitly or implicitly signaled from the NodeB or from the RNC 130. The second timing settings are to be used by the second set of user equipments for AICH response timing. The user equipment is comprised in the second set of user equipments. In some embodiments, the second AICH response timing is associated with a second level of receiver processing within the NodeB. The second AICH response timing may be extended compared to the first AICH response timing. E.g., in this example the second level is a level that relates to an advanced receiver processing which is more time consuming than the first level. In these embodiments, the second set of user equipments may refer to newer user equipments of later releases compared to the first set of user equipments.

The first timing settings may be used also by the user equipment comprised in the second set of user equipments. As mentioned above, the idea here is that the user equipment that belongs to the second set of user equipments, i.e., a newer user equipment will first try the first timing and if it does not receive an AICH response at this setting, it will wait a little longer and see if there is an AICH response at the second timing.

In some embodiments, the user equipment also uses multiple AICH response timings.

Action 403

The user equipment starts a RACH procedure by transmitting a PRACH preamble to the NodeB.

Action 404

In this example, the NodeB may use its advanced RACH receiver that require more processing time, since the user equipment being comprised in the second set of user equipments is informed of the second AICH response timing to be used, that in this example is extended compared to the first AICH response timing. When the PRACH preamble is detected by the NodeB, NodeB transmits an acquisition indication. So in this action 404, the user equipment receives the acquisition indication from the NodeB according to the second timing settings. The user equipment has been informed about the second AICH response timing and is therefore aware of when the acquisition indication may be expected.

In some embodiments the user equipment waits for a first response in an AICH access slot according to the shortest AICH response timing requirements when having transmitted a Physical RACH preamble to the NodeB. If no response is received the user equipment checks for a response regarding the same Physical RACH preamble transmission in a later AICH access slot according to the second shortest AICH response timing requirement.

To perform the method actions described above for enhancing RACH performance, the user equipment comprises the following arrangement depicted in FIG. 5. As mentioned above, user equipments within the network 100 are divided into one or more set of user equipments. In the embodiments in this example they are divided into two sets, a first set of user equipments and a second set of user equipments. The user equipments may for example be divided into the first set of user equipments and the second set of user equipments based on a user equipment category or a user equipment capability.

The user equipment comprises a receiving unit 510 configured to receive first timing settings explicitly or implicitly signaled from the NodeB or from the RNC 130. The first timing settings are to be used by the first set of user equipments for a first AICH response timing, which first AICH response timing is associated with a first level of receiver processing.

The receiving unit 510 is further configured to receive second timing settings explicitly or implicitly signaled from the NodeB or from the RNC 130. The second timing settings are to be used by a second set of user equipments for AICH response timing. The user equipment is comprised in the second set of user equipments.

The second AICH response timing may be extended compared to the first AICH response timing. In some embodiments, the first AICH response timing is associated with a first level of receiver processing within the NodeB, and the second AICH response timing is associated with a second level of receiver processing within the NodeB. The first timing settings may be used also by the user equipment comprised in the second set of user equipments.

The receiving unit 510 may further be configured to receive an acquisition indication from the NodeB according to the second timing settings. The user equipment may in some embodiments use multiple AICH response timings.

The receiving unit 510 may further be configured to wait for a first response in an AICH access slot according to the shortest AICH response timing requirements when having transmitted a Physical RACH preamble to the NodeB, and to check for a response regarding the same Physical RACH preamble transmission in a later AICH access slot according to the second shortest AICH response timing requirement if no response is received.

The user equipment further comprises a transmitting unit configured to transmit a Physical RACH preamble to the NodeB.

The embodiments herein for enhancing RACH performance may be implemented through one or more processors, such as a processor in the user equipment depicted in FIG. 5, together with computer program code for performing the functions and actions of the embodiments herein. The program code mentioned above may also be provided as a computer program product, for instance in the form of a data carrier carrying computer program code for performing the embodiments herein when being loaded into the in the user equipment. One such carrier may be in the form of a CD ROM disc. It is however feasible with other data carriers such as a memory stick. The computer program code may furthermore be provided as pure program code on a server and downloaded to the user equipment.

The user equipment may further comprise a memory comprising one or more memory units. The memory 540 is arranged to be used to store data such as preambles, timing settings such as the first and second timing settings, schedulings, and applications to perform the methods herein when being executed in the user equipment.

Embodiments Applicable to all the Embodiments Described Above

In the following, embodiments are described which are applicable to the variants and embodiments described above.

Figure 6:
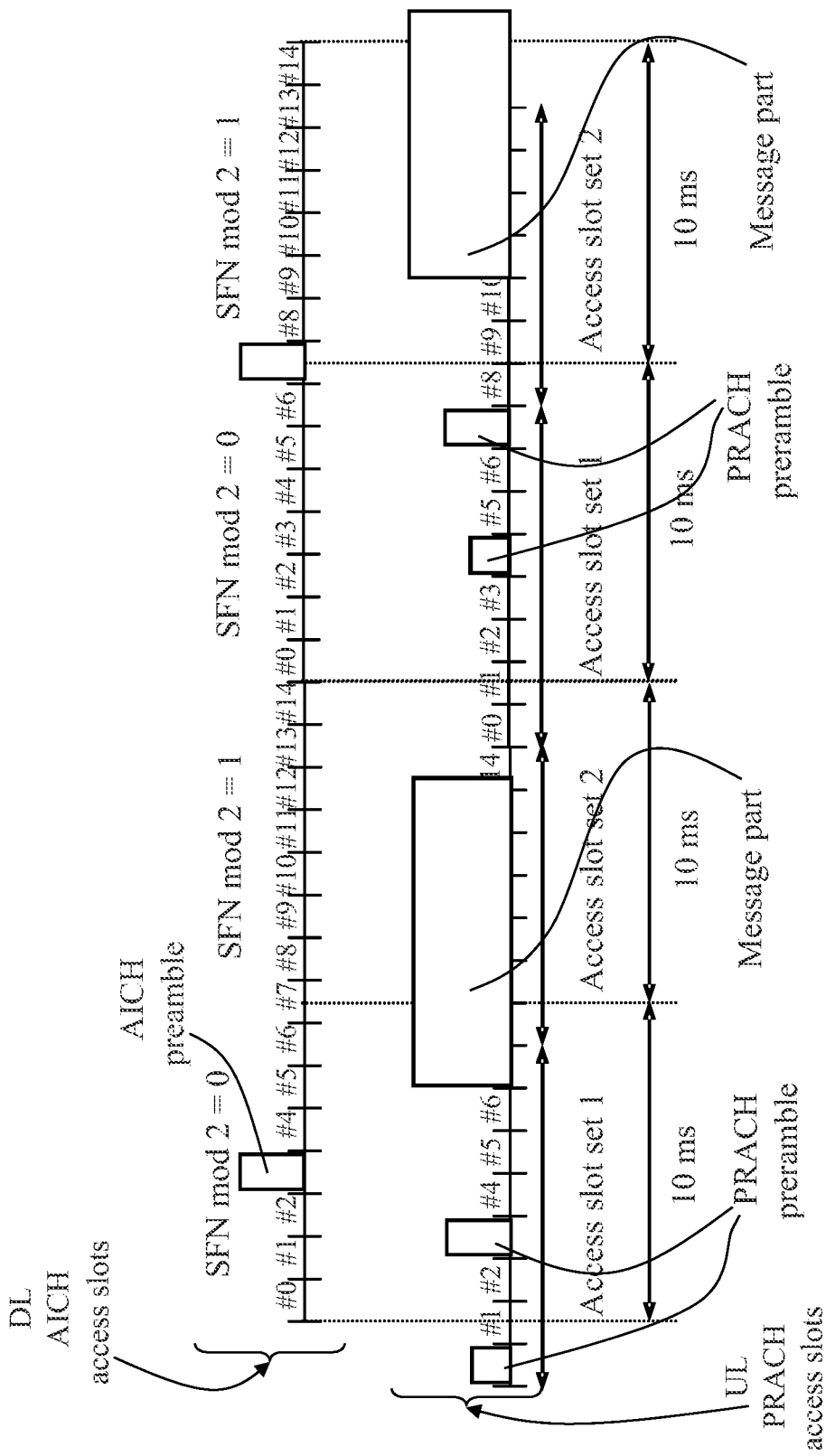
FIG. 6 is a schematic block diagram illustrating random access procedure.

As mentioned above, the RACH procedure includes a power-ramping phase on the PRACH, to find the correct power level, which may be seen in FIG. 6. FIG. 6 illustrates random access behavior. The upper axis depicts DL AICH access slots, and the lower axis depicts UL PRACH access slots seen from the user equipment. A power-ramping on PRACH is followed by an indication on the AICH. A positive acknowledgement on AICH will result in a transmission of data on PRACH carrying RACH payload.

Once user equipment is detected on PRACH, the Node B 110 responds with an acquisition indication on the AICH, which acknowledges the correct power level on PRACH. The user equipment then continues by transmitting RACH payload carried on PRACH.

As user equipments begin to spend more time in CELL_FACH instead of CELL_DCH, the preamble detection performance becomes more important. At the same time, the preamble detection becomes more and more challenging due to the desire to operate at a higher noise rise due to the increased uplink throughput demands and uplink peak rate improvements.

Relatively minor changes to the preamble ramping procedure may be considered in order to help retain the uplink coverage for the preamble part in scenarios where E-DCH is operated with a high noise rise. One approach according to embodiments herein is to increase the time provided between the preamble detection and the required response on AICH in order to enable usage of more advanced preamble receivers such as Interference Cancellation IC receivers. The interference may be E-DCH transmissions from other user equipments, user equipments that may reside in Cell_FACH or Cell_DCH state. In interference cancellation the signals from interfering user equipments are received, regenerated and subtracted from the received signal before the reception of the desired user equipments signal, in this example the RACH preamble. This helps reduce the interference when detecting the preamble part and/or reduce the latency for the message part as fewer preambles may be needed during each access attempt. Typically it is interference from other signals that are cancelled to benefit the preamble detection, so it is not the interference from the preamble that is cancelled.

Figure 7:
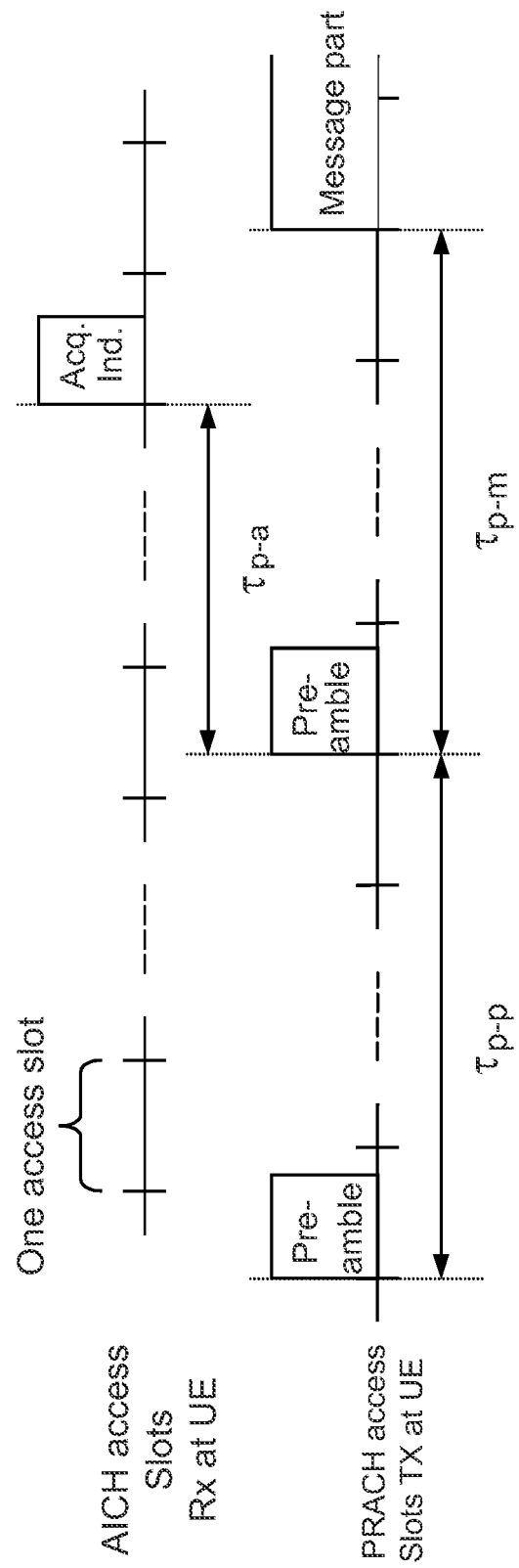
FIG. 7 is a schematic block diagram illustrating random access procedure.

FIG. 7 depicts timing relation between PRACH and AICH as seen at the user equipment. In WCDMA the random access channel is divided in time into 750 access slots per second, and there are up to 16 different preambles that can be used per scrambling code. When making a random access attempt the user equipment chooses from a subset of the access slots and must randomly select one preamble out of a subset of the up to 16 possible preambles. After the preamble has been transmitted the user equipment waits for a response on the AICH. The timing of this response is determined by the parameter $\tau_{p-a}$.

In embodiments related to 3GPP based systems the multiple timing settings may be realized by using multiple, different, parameters $\tau_{p-a}$, see FIG. 7. These parameter values may be explicitly or implicitly signaled by the network, either as broadcasted cell information from the Node B 110 to the user equipment or as dedicated RRC signaling from the RNC 130 to the user equipment.

In the timing relation for Common E-DCH the values of $\tau_{p-p}$ and $\tau_{p-a}$ depend on the setting of higher layer parameter AICH_Transmisson_Timing. $\tau_{p-p}$ is the inter-preamble time periodicity for subsequent preambles in the preamble ramping procedure. For example:

When AICH_Transmission_Timing is set to 0, then
$\tau_{p-p}$=3 access slot
$\tau_{p-a}$=1.5 access slot
When AICH_Transmission_Timing is set to 1, then
$\tau_{p-p}$=4 access slot
$\tau_{p-a}$=2.5 access slots The time available for the NodeB processing needed for the preamble detection before the response needs to be transmitted on AICH, is decreased by the round trip time, i.e., the propagation delay times two.

There is very limited time available for any sort of advanced processing of the signal. As mentioned above, the second AICH response timing may be extended compared to the first AICH response timing. This may be performed by increasing $\tau_{p-p}$ and $\tau_{p-a}$ in order to provide more time for NodeB processing. The easiest way is to introduce additional values for AICH_Transmission_Timing, for example:

When AICH_Transmission_Timing is set to 2, then
$\tau_{p-p}$=6 access slots
$\tau_{p-a}$=4.5 access slots
When AICH_Transmission_Timing is set to 3, then
$\tau_{p-p}$=7 access slots
$\tau_{p-a}$=5.5 access slots In the above examples it is assumed that 3 additional slots are needed to wait for the 2-ms E-DCH TTI to be received and 1-3 slots for advanced processing (IC). This additional parameter value would only be available for new user equipments supporting the enhancement, such as the user equipment according to this example. The exact values may require some further investigation. Assuming that Rel-11 user equipments supporting "Further Enhancements to CELL_FACH" will access the network 100 using a specific subset of the available preamble signatures, possibly on a separate uplink scrambling code, a separate AICH_Transmission_Timing parameter may be used for these signatures. Legacy user equipments are still supported but they will not enjoy the improved preamble detection performance in high noise rise scenarios. One way to handle this is to operate different carriers with different noise rise targets.

According to some embodiments, the second set of user equipments use another scrambling code than a scrambling code used by the first set of user equipments for RACH transmission, i.e., the new timing configuration. The user equipments scramble their preambles with a scrambling code. This scrambling code is most often the same for all user equipments today. To make it possible for the NodeB to divide release 99 user equipments from user equipments that support the new extended timing AND have been configured by the network by RNC 130 and/or NodeB to apply the extended timing, e.g., new release 11 user equipments or any later release user equipments, the system may tell the release 11 or later user equipments to use a second scrambling code. Then the NodeB RACH preamble detector will know which kind of user equipment it has detected based on the scrambling code that the user equipments used. E.g., when the NodeB detects that a preamble from the user equipment, is scrambled with the second scrambling code, the NodeB know that it is a release 11 user equipment, that it has more time for advanced processing and that it can transmit the detection response on AICH at a later time.

In some embodiments, different subsets of available preamble signatures and/or different subsets of the available access slots are used to separate the different first and second sets of user equipments with different AICH response timings, i.e., acknowledgement timings. The system, i.e., the network 100 broadcasts information to the user equipments not only about which scrambling code they should use when scrambling their RACH preambles, but also about which preamble signatures are allowed to be used by different user equipment categories and in what access slots different user equipment categories are allowed to transmit their RACH preambles. It is the preamble signature that is scrambled and the result is the final preamble signal. This gives an operator the possibility to give some groups of user equipments a Very Important Person (VIP) status so that in certain access slots, time periods, only the VIP user equipments may make a random access attempt to set up a connection. This may be used for emergency calls so that those calls are not interfered by other random access attempts. But this may also be used to divide the available access slots, such as time chunks, into release 99-only access slots and release 11-only access slots so that when the NodeB RACH preamble detector hears a preamble it knows if it is from a release 99 or release 11 user equipment because it knows which access slot is currently being processed.

An EAI signature may be used as a response to a corresponding RACH preamble signature as a one-to-one mapping for one out of: the first set of user equipments and second set of user equipments. This is an advantage because for example when the response on AICH will come at a new, delayed, point in time for a user equipment in the second set of user equipments such as e.g., a release 11 user equipment, it may interfere and be mixed up with an AICH response that is transmitted at the same time for a user equipment in the first set of user equipments such as a release 99 user equipment, which was detected later than the release 11 user equipment but due to the shorter response time, i.e., the responses where transmitted simultaneously. By then instead using EAI instead of AI as the response, the user equipments will not be confused. The EAI and AI do not interfere with each other.

This means that the acknowledgments on AICH that are sent using the second timing setting was to be acknowledged with an EAI instead of an AI. This may be necessary if both first and second sets of user equipments use all available RACH signatures, then a way to distinguish between acknowledgements for the first and second timing settings would be to use AI for the first timing setting and EAI for the second timing or vice versa. If both used AI then there may be collisions: Assume that two user equipments, one from the first set of user equipments and one from the second set of user equipments both transmit preambles, but the user equipment from the first set of user equipments sends its preamble a bit later than the user equipment from the second set of user equipments. Then in some cases both user equipments will expect the acknowledgment in the same access slot. Then it is good to distinguish the two acknowledgements from each other by using AI for the first timing and EAI for the second timing or vice versa.

As mentioned above, the first timing settings may be used also by the user equipment comprised in the second set of user equipments. According to some embodiments, if a second set user equipment can use both a first and a second timing setting it will wait for an acknowledgement using AI after the first time interval. If it does not receive it, second set user equipment waits for EAI that will maybe come a bit later if the NodeB using the second level of advanced receiver processing is able to detect the preamble. E.g., an AI signature may be used as a response to a corresponding RACH preamble signature from a user equipment in the first set of user equipments, and an EAI, signature may be used as a response to a corresponding RACH preamble signature from a user equipment from the second set of user equipments.

As mentioned above, in some embodiments some user equipments use only one response timing while other sets of user equipments use multiple timings. An example of the latter sort of user equipment is when the user equipment is a user equipment that transmits a preamble and waits for a first response in the AICH access slot according to the shortest timing requirements, and if no response is received, it checks for a response regarding the same preamble transmission in a later AICH access slot according to the second shortest timing requirement, etc.

In one embodiment the first set of user equipments use the random access and AICH response timing, i.e., according to the second timing settings, as specified in either Release 99 or Release 8 of the 3GPP specifications. A second set of user equipments use a new random access and AICH response timing configuration, i.e., according to the second timing settings. In one embodiment these user equipments are acknowledged using the EAIs in AICH. The second set of user equipments may possibly also, in addition, use the first response timing and then be acknowledged according to Release 8 of the 3GPP specifications.

In one embodiment as mentioned above, each EAI signature is used as a response to a corresponding RACH preamble signature as a one-to-one mapping for one set of user equipments.

When using the word "comprise" or "comprising" it shall be interpreted as non-limiting, i.e., meaning "consist at least of".

The embodiments herein are not limited to the above described preferred embodiments. Various alternatives, modifications and equivalents may be used. Therefore, the above embodiments should not be taken as limiting the scope of the disclosure, which is defined by the appending claims.

Thus, the foregoing description and the accompanying drawings represent non-limiting examples of the methods and apparatus taught herein. As such, the present disclosure is not limited by the foregoing description and accompanying drawings. Instead, the present disclosure is limited only by the following claims and their legal equivalents.

What is claimed is:

1. A method in a user equipment (UE) for enhancing Random Access Channel (RACH) performance, comprising:
   receiving first timing settings explicitly or implicitly signaled from a NodeB or from a Radio Network Controller (RNC) to be used by a first set of UEs for a first Acquisition Indication Channel (AICH) response timing;
   receiving second timing settings explicitly or implicitly signaled from the NodeB or from the RNC to be used by a second set of UEs for a second AICH response timing, wherein the UE is included in the second set of UEs;
   transmitting a Physical RACH preamble to the NodeB;
   waiting for a response to the Physical RACH preamble in an AICH access slot according to a shortest one of the first AICH response timing and the second AICH response timing; and
   if no response is received, checking for a response regarding the same Physical RACH preamble transmission in a later AICH access slot according to a second shortest of the first AICH response timing and the second AICH response timing.

2. The method of claim 1, wherein the first AICH response timing is associated with a first level of receiver processing, and wherein the second AICH response timing is associated with a second level of receiver processing within the NodeB.

3. The method of claim 1, wherein the second AICH response timing is extended compared to the first AICH response timing.

4. The method of claim 1, further comprising:
   transmitting a Physical RACH preamble to the NodeB;
   receiving an acquisition indication from the NodeB according to the second timing settings.

5. The method of claim 1, wherein the second set of UEs use a scrambling code other than a scrambling code used by the first set of UEs for RACH transmission.

6. The method of claim 1, wherein different subsets of available preamble signatures, different subsets of available access slots, or both, are used to separate the different first and second sets of UEs with different AICH response timings.

7. The method of claim 1, further comprising receiving an Extended Acquisition Indication (EAI) signature as a response to a corresponding RACH preamble signature, the EAI signature corresponding to a one-to-one mapping for one of the first set of UEs and the second set of UEs.

8. The method of claim 1, wherein the UE uses multiple AICH response timings.

9. A user equipment (UE) for enhancing Random Access Channel (RACH) performance, comprising:
a receiving circuit configured to:
receive first timing settings explicitly or implicitly signaled from a NodeB or from a Radio Network Controller (RNC) for use by a first set of UEs for a first Acquisition Indication Channel (AICH) response timing;
receive second timing settings explicitly or implicitly signaled from the NodeB or from the RNC, for use by a second set of UEs for a second AICH response timing, and wherein the UE is included in the second set of UEs;
wait for a first response in an AICH access slot according to a shortest one of the first AICH response timing and the second AICH response timing when the transmitting circuit has transmitted a Physical RACH preamble to the NodeB;
check for a response regarding the same Physical RACH preamble transmission in a later AICH access slot according to a second shortest of the first AICH response timing and the second AICH response timing if no response is received.

10. The UE of claim 9, wherein the first AICH response timing is associated with a first level of NodeB receiver processing, and wherein the second AICH response timing is associated with a second level of NodeB receiver processing.

11. The UE of claim 9, wherein the second AICH response timing is extended compared to the first AICH response timing.

12. The UE of claim 9:
further comprising a transmitting circuit configured to transmit a Physical RACH preamble to the NodeB;
wherein the receiving circuit is further configured to receive an acquisition indication from the NodeB according to the second timing settings.

13. The UE of claim 9, wherein the second set of UEs use a scrambling code other than a scrambling code used by the first set of UEs for RACH transmission.

14. The UE of claim 9, wherein different subsets of available preamble signatures, different subsets of available access slots, or both, are used to separate the different first and second sets of UEs with different AICH response timings.

15. The UE of claim 9, wherein the receiving circuit is further configured to receive an Extended Acquisition Indication (EAI) signature as a response to a transmitted RACH preamble signature, the EAI signature corresponding to a one-to-one mapping for one of the first set of UEs and the second set of UEs.

16. The UE of claim 9, wherein the transmitting circuit is further configured to use multiple AICH response timings.

* * * * *